United States Patent
Takeoka et al.

(10) Patent No.: US 10,121,124 B2
(45) Date of Patent: Nov. 6, 2018

(54) INFORMATION PROCESSING DEVICE, INFORMATION PROCESSING METHOD AND PROGRAM

(71) Applicant: Sony Corporation, Minato-ku (JP)

(72) Inventors: Yoshiki Takeoka, Tokyo (JP); Atsushi Ishihara, Tokyo (JP); Yoshinori Kurata, Ibaraki (JP); Hajime Senuma, Kanagawa (JP); Masayuki Takada, Tokyo (JP); Shouichi Doi, Kanagawa (JP); Masahiro Morita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 917 days.

(21) Appl. No.: 14/294,281

(22) Filed: Jun. 3, 2014

(65) Prior Publication Data

US 2015/0012321 A1  Jan. 8, 2015

(30) Foreign Application Priority Data

Jul. 2, 2013  (JP) ................................. 2013-138791

(51) Int. Cl.
*G06Q 10/00* (2012.01)
*G06Q 10/10* (2012.01)

(52) U.S. Cl.
CPC ..... *G06Q 10/1095* (2013.01); *G06Q 10/1093* (2013.01); *G06Q 10/10* (2013.01); *G06Q 10/109* (2013.01)

(58) Field of Classification Search
CPC ........... G06Q 10/1095; G06Q 10/1093; G06Q 10/109; G06Q 10/10
See application file for complete search history.

(56) References Cited

U.S. PATENT DOCUMENTS

| | | | |
|---|---|---|---|
| 2004/0039814 A1* | 2/2004 | Crabtree | G06F 17/30867 709/224 |
| 2005/0034079 A1* | 2/2005 | Gunasekar | G06F 17/289 715/753 |
| 2005/0101335 A1* | 5/2005 | Kelly | G06Q 10/109 455/456.3 |
| 2007/0094065 A1* | 4/2007 | Wu | G06Q 10/109 705/7.19 |

(Continued)

FOREIGN PATENT DOCUMENTS

JP   9-91341   4/1997

OTHER PUBLICATIONS

Nawi, M. A. Md, et al. "Context-Aware Instant Messenger with Integrated Scheduling Planner." 2012 International Conference on Computer & Information Science (ICCIS), Jun. 12-14, 2012. (Year: 2012).*

*Primary Examiner* — William S Brockington, III
(74) *Attorney, Agent, or Firm* — Xsenus, LLP

(57) ABSTRACT

There is provided an information processing device including a request transmitting portion that transmits a request, a response receiving portion that receives a response corresponding to the request, a response analyzing portion that analyzes the response, a text output portion that outputs, to the user, text generated based on the response analysis result, a request generating portion that newly generates the request based on the response analysis result or text input by the user, and a timing control portion that controls a timing at which the request is newly generated based on a timing at which the generated text is output.

12 Claims, 13 Drawing Sheets

(56) References Cited

U.S. PATENT DOCUMENTS

| | | | | |
|---|---|---|---|---|
| 2007/0136303 | A1* | 6/2007 | Singhai | G06Q 10/10 |
| 2007/0288546 | A1* | 12/2007 | Rosenberg | G06Q 10/10 709/201 |
| 2010/0180211 | A1* | 7/2010 | Boyd | G06Q 10/109 715/751 |
| 2010/0293029 | A1* | 11/2010 | Olliphant | G06Q 10/06314 705/7.19 |
| 2010/0312831 | A1* | 12/2010 | Xie | G06Q 10/109 709/204 |
| 2013/0275523 | A1* | 10/2013 | Jang | G06Q 10/109 709/206 |

* cited by examiner

INFORMATION PROCESSING DEVICE, INFORMATION PROCESSING METHOD AND PROGRAM

CROSS REFERENCE TO RELATED APPLICATIONS

This application claims the benefit of Japanese Priority Patent Application JP 2013-138791 filed Jul. 2, 2013, the entire contents of which are incorporated herein by reference.

BACKGROUND

The present disclosure relates to an information processing device, an information processing method and a program.

With regard to a computer agent that executes various procedures in the place of a user (that is, agent software that operates on a computer, hereinbelow also referred to simply as an agent) various technologies have previously been proposed. For example, JP H09-91341A discloses an agent that, in the event of a conference to be held, inquires with the agent of each user as to the available time in the schedules of persons planning to attend, and based on that result determines the optimum time for holding the conference.

SUMMARY

However, in the technology disclosed for example in the aforementioned JP H09-91341A, since the time for holding an event is automatically determined in accordance with the available time in people's schedules, it has been difficult to take into consideration information that is not easily obtained from registered schedules. Examples of such information include the travel time for a user to attend a conference, and the priorities of people expected to attend in the case of difficulties for everyone to attend the conference.

Therefore, the present disclosure provides a new and improved information processing device, an information processing method, and a program that enable the execution of a more suitable procedure by an agent incorporating information from users.

According to an embodiment of the present disclosure, there is provided an information processing device including a request transmitting portion that transmits a request, a response receiving portion that receives a response corresponding to the request, a response analyzing portion that analyzes the response, a text output portion that outputs, to the user, text generated based on the response analysis result, a request generating portion that newly generates the request based on the response analysis result or text input by the user, and a timing control portion that controls a timing at which the request is newly generated based on a timing at which the generated text is output.

According to another embodiment of the present disclosure, there is provided an information processing method including transmitting a request, receiving a response corresponding to the request, analyzing the response, outputting, to the user, text generated based on the response analysis result, newly generating the request based on the response analysis result or text input by the user, and controlling a timing at which the request is newly generated based on a timing at which the generated text is output.

According to another embodiment of the present disclosure, there is provided a program for causing a computer to realize a function that transmits a request, a function that receives a response corresponding to the request, a function that analyzes the response, a function that outputs, to the user, text generated based on the response analysis result, a function that newly generates the request based on the response analysis result or text input by the user, and a function that controls a timing at which the request is newly generated based on a timing at which the generated text is output.

According to one or more of embodiments of the present disclosure, it is possible to execute a more suitable procedure by an agent incorporating information from users.

DETAILED DESCRIPTION OF THE EMBODIMENT(S)

Figure 1:
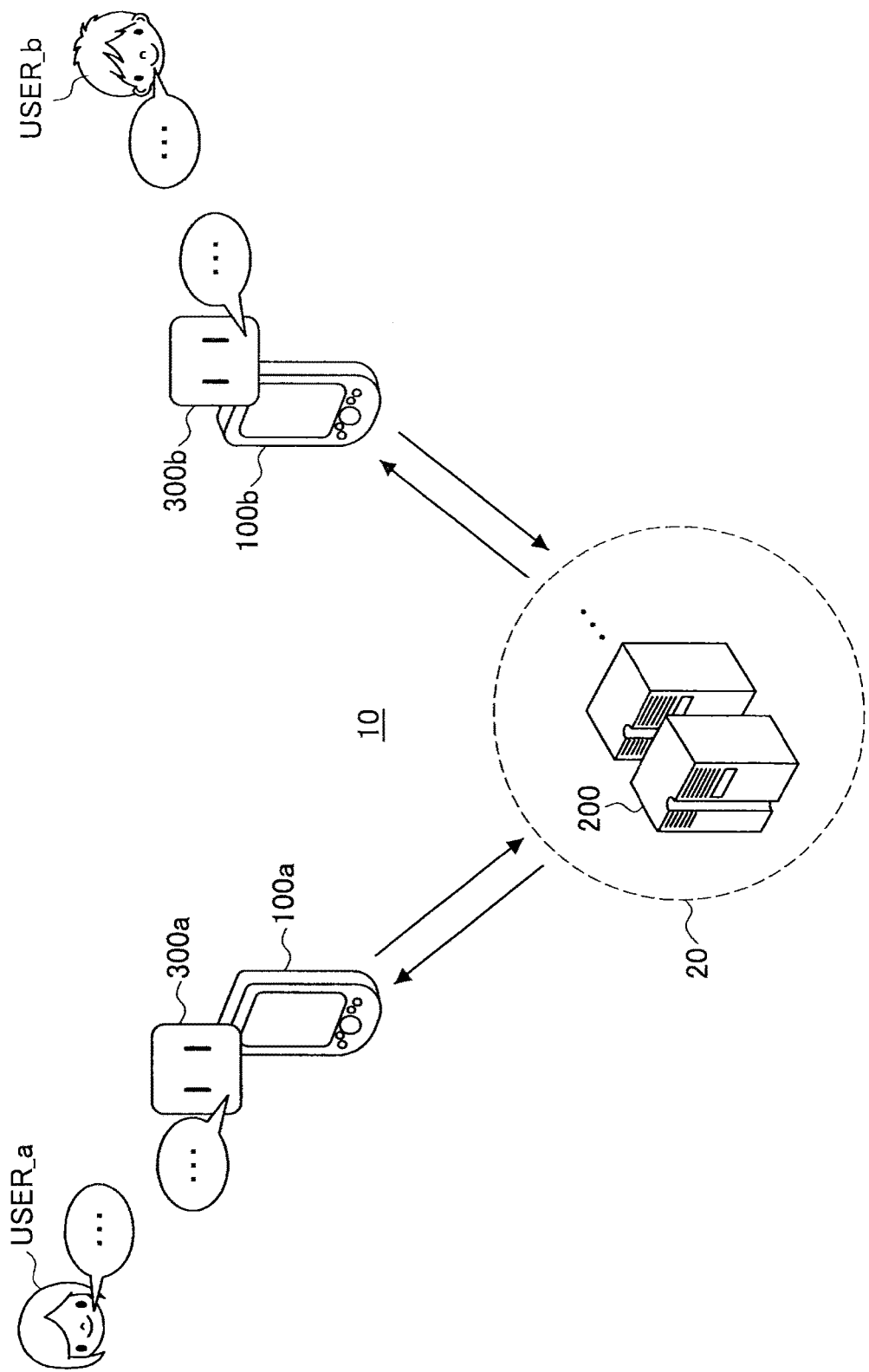
FIG. 1 is a drawing that shows that shows a schematic constitution of the information processing system according to the first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description shall be provided in the following order:
1. First Embodiment
1.1 System constitution
1.2 Function constitution
1.3. Process flow
1.4. Specific examples
2. Second Embodiment 2.1 Process flow
2.2 Specific examples
3. Addendum

1. First Embodiment

1.1 System Constitution

FIG. 1 is a drawing that shows that shows a schematic constitution of the information processing system according to the first embodiment of the present disclosure. Referring to FIG. 1, a system 10 includes a client device 100 and a server device 200. A server 20 is constituted by a single server device 200 or the collaboration of a plurality of server devices 200. The server 20 communicates with the client device 100 via a network, and provides services to the client device 100.

An agent 300 is operating in the client device 100. In the illustrated example, there are two client devices 100a and 100b, and agents 300a and 300b are operating in the respective devices. The agents 300a and 300b interact with the respective users (USER_a and USER_b), and based on the information that is obtained by that interaction, execute various procedures on behalf of the user (USER_a and USER_b).

Here, a process relating to the agent 300 may be executed mainly by the client device 100. In this case, each of the client devices 100a and 100b execute processes relating to the agent 300. A request that the agent 300a has generated in the client device 100a is transmitted to the client device 100b via the server 20, and the agent 300b processes it in the client device 100b. A response that the agent 300b has generated with respect to the request is transmitted to the client device 100a again via the server 20.

Alternatively, a process relating to the agent 300 may be distributed among the client device 100 and the server 20, or mainly executed by the server 20. In this case, the information that is acquired by the client devices 100a and 100b interacting with the users is transmitted to the server 20, and the server 20 executes the processes based on that information. Also, the information that the server 20 has generated is transmitted to the client devices 100a and 100b, and output in the interactions with the users. Accordingly, the request and response between the agent 300a and the agent 300b are internally transmitted within the server 20.

(Constitution of Client Device)

Figure 2:
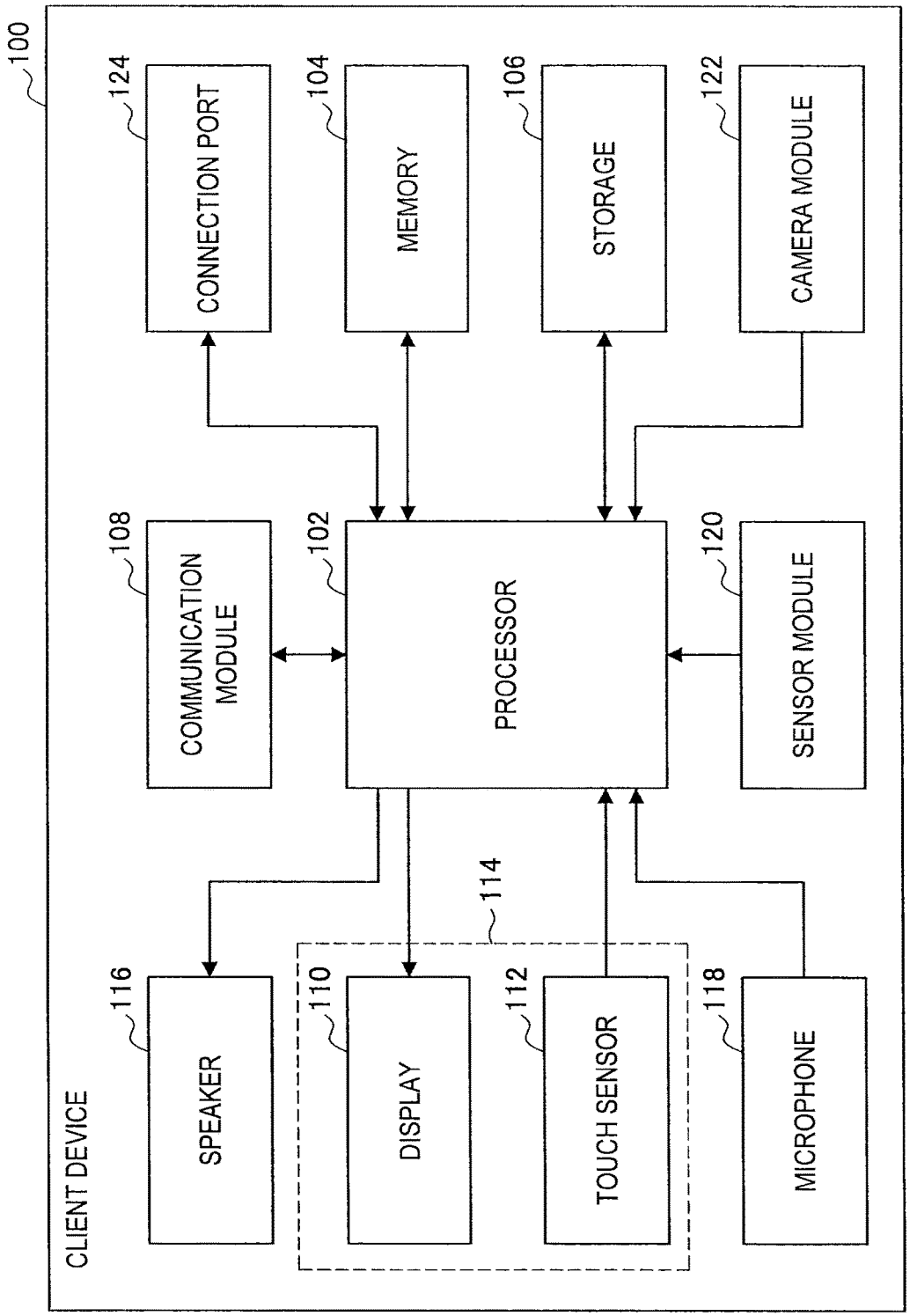
FIG. 2 is a block drawing that shows the schematic constitution of a client device according to the first embodiment of the present disclosure.

FIG. 2 is a block drawing that shows the schematic constitution of a client device according to the first embodiment of the present disclosure. Referring to FIG. 2, the client device 100 includes a processor 102, memory 104, storage 106, a communication module 108, a touch panel 114 that is constituted by a display 110 and a touch sensor 112, a speaker 116, a microphone 118, a sensor module 120, a camera module 122, and a connection port 124.

The processor 102 is realized by for example a central processing unit (CPU), a digital signal processor (DSP), an application-specific integrated circuit (ASIC) or the like, and realizes various functions by operating in accordance with a program that is stored in the memory 104. The processor 102, by controlling each portion of the client device 100, acquires various inputs or provides various outputs. Note that the functions realized by the processor 102 shall be described in detail below.

The memory 104 is realized for example by a semiconductor memory that is used for example as random-access memory (RAM) or read-only memory (ROM). A program for example for the processor 102 to operate is stored in the memory 104. This program may for example be read out from the storage 106 and temporarily deployed to the memory 104, or may be continuously stored in the memory 104. Alternatively, the program may be received by the communication module 108, and temporarily deployed to the memory 104. The memory 104 moreover temporarily or continuously stores various data that are generated by the processing of the processor 102.

The storage 106 is realized by for example a storage device that uses a magnetic disk such as a hard disk drive (HDD), an optical disk, or a magneto-optical disk, or by flash memory or the like. For example, a program for the processor 102 to operate or various data that are generated by the processing of the processor 102 are continuously stored in the storage 106. The storage 106 may be configured to include removable media, or may be built into the client device 100.

The communication module 108 is realized by various types of communication circuits that execute wired or wireless network communication in accordance with control of the processor 102. In the case of executing wireless communication, the communication module 108 may include an antenna. The communication module 108 executes network communication in accordance with Internet and local area network (LAN) protocol or transmission standards such as Bluetooth (registered trademark). Information that is generated by the client device 100 is transmitted to the server 20 or another client device 100 by the communication module 108, and various types of information may be received from the server 20 or another client device 100 by the communication module 108.

The display 110 is realized by for example a liquid crystal display (LCD) or an organic electro-luminescence (organic EL) display or the like. The display 110 displays as an image various information in accordance with the control of the processor 102. In the illustrated example, since the touch panel 114 that is constituted by the display 110 and the touch sensor 112 is used as the input unit, the display 110 displays a graphical user interface (GUI) image that can be operated by the touch sensor 112.

The touch sensor 112 is realized for example by a sensor such as an electrostatic capacitance type sensor that is arranged at a position corresponding to the display 110. The touch sensor 112 acquires touch operations of the user on the GUI image that is displayed in the display 110. Note that in another embodiment, a pointing device like a mouse or a touchpad, or another input device such as a button may be adopted in conjunction with the touch sensor 112 or as a substitute therefor.

The speaker 116 outputs as sound various information in accordance with the control of the processor 102. The microphone 118 acquires sounds of various types that are generated in the vicinity of the client device 100, for example, utterances by the user, and provides them to the processor 102 as speech data.

The sensor module 120 is realized by for example various kind of sensors such as an acceleration sensor, a gyro sensor, a magnetic field sensor, an optical sensor, an atmospheric-pressure sensor, or a sound sensor, and a processing circuit that belongs to the sensor. The sensor module 120, in addition to acquiring information relating to the state of the client device 100 itself, such as the acceleration acting on the case of the client device 100, the orientation of the case and the like, may acquire information relating to the ambient surroundings of the client device 100, such as the brightness and noise of the surroundings of the client device 100. Also, a Global Positioning System (GPS) sensor that receives a GPS signal and measures the latitude, longitude, and altitude of the client device 100 may be included in the sensor module 120.

The camera module 122 is realized by an image sensor such as a charge coupled device (CCD) or a complementary metal oxide semiconductor (CMOS), an optical system such as a lens for controlling the image formation of the object image to the image sensor, and a drive circuit that drives the image sensor and the optical system. The camera module 122 provides still images or video generated by the image sensor imaging an object image to the processor 102 as image data.

The connection portion 124 is a port for directly connecting an external device to the client device 100, and for example is realized by a Universal Serial Bus (USB) port, an IEEE 1394 port, or a High-Definition Multimedia Interface (HDMI) (registered trademark) port. The external device to be connected to the connection portion 124 may be a display device (external display or the like), an input device (keyboard, mouse or the like), or a storage device (external HDD or the like) but is not limited to these examples.

The client device 100 that includes the constituent elements described above may for example be a smartphone, a tablet device, or a personal computer (PC). Also, the client device 100 may be a media player, a game console, or a television. In the present embodiment, the client device 100 can realize the functions of an information processing device according to an embodiment of the present disclosure by itself or by collaboration with the server device 20.

(Constitution of Server Device)

Figure 3:
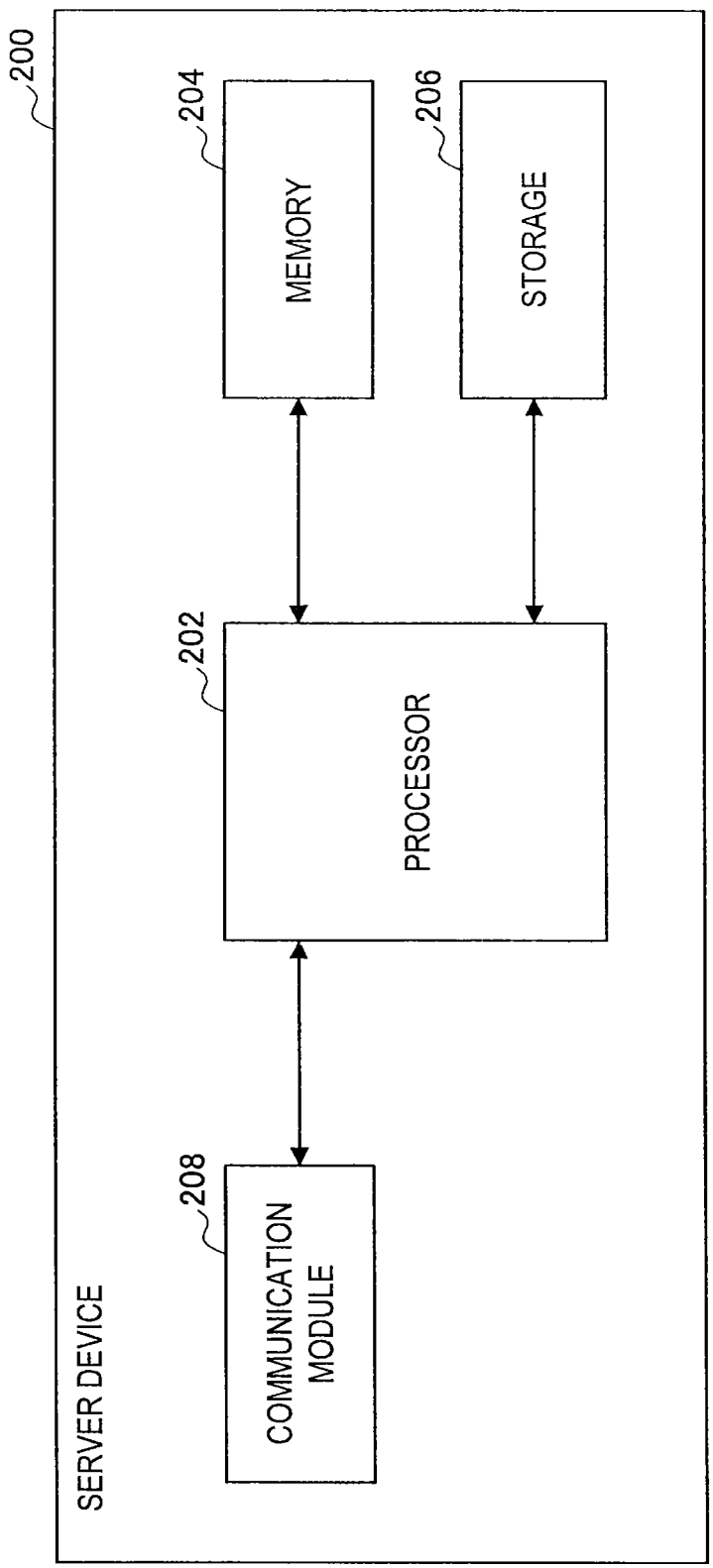
FIG. 3 is a block drawing that shows the schematic constitution of the server device according to the first embodiment of the present disclosure.

FIG. 3 is a block drawing that shows the schematic constitution of the server device according to the first embodiment of the present disclosure. Referring to FIG. 3, the server device 200 may include a processor 202, memory 204, storage 206, and a communication module 208.

Note that in the following description, the server device 200 is described as a device that is installed with the main purpose of providing services to the client device 100 on a network, with the server itself not carrying out information output to users or acquiring operation inputs, except for the case of setting operations and the like. However, the server device 200 is not limited to this kind of device, and it may be a device having the same constitution as for example the client device 100. That is to say, an example is also possible in which, for example, a desktop computer that a user has installed in his/her home functions as the server device 200, and a smartphone that a user carries functions as the client device 100.

The processor 202 is realized by for example a CPU, DSP, or ASIC, and realizes various functions by operating in accordance with a program that is stored in the memory 204. The processor 202 acquires information that is transmitted from the client device 100 via the communication module 208, and executes various processes based on this information. The processor 202 transmits information of the process result to the client device 100 via the communication module 208. Here, the server device 200 may be capable of providing a service to a plurality of the client devices 100. Accordingly, the processor 202 may execute a process based on information that is transmitted from each of the plurality of client devices 100, and transmit information of the process result to a client device 100 other than the client device 100 that transmitted the original information.

The memory 204 is realized by semiconductor memory that is used for example as RAM or ROM. A program for example for the operation of the processor 202 is stored in the memory 204. This program may for example be read out from the storage 206 and temporarily deployed to the memory 204, or may be continuously stored in the memory 204. Alternatively, the program may be received by the communication module 208, and temporarily deployed to the memory 204. The memory 204, moreover, temporarily or continuously stores various data that are generated by the processing of the processor 202.

The storage 206 is realized by for example a storage device that uses a magnetic disk such as a HDD, an optical disk, or a magneto-optical disk, or by flash memory or the like. For example, a program for the operation of the processor 202 or various data that are generated by the processing of the processor 202 are continuously stored in the storage 206. The storage 206 may be constituted including removable media, or may be built into the server device 200.

The communication module 208 is realized by various types of communication circuits that execute wired or wireless network communication in accordance with control of the processor 202. In the case of executing wireless communication, the communication module 208 may include an antenna. The communication module 208 executes network communication in accordance with Internet and LAN protocol or transmission standards such as Bluetooth (registered trademark). Information that is generated by the server device 200 is transmitted to the client device 100 or another server device 200 by the communication module 208, and various types of information may be received from the client device 100 or another server device 200 by the communication module 208. In the case of the server 20 being constituted by the collaboration of a plurality of server devices 200, the processor 202 of each of the server devices 200 exchanges information relating to processing via the communication module 208.

1.2 Function Constitution

Figure 4:
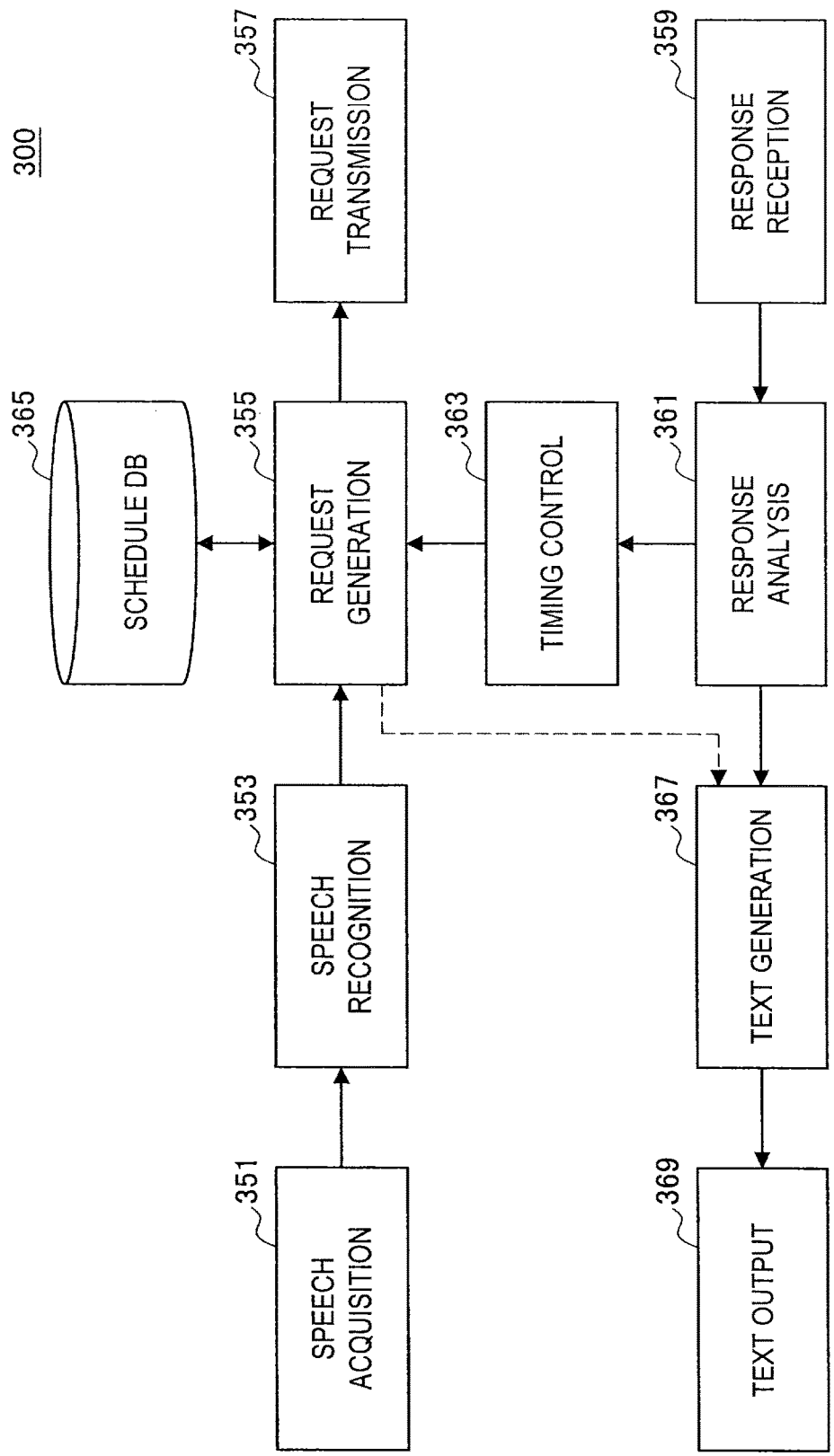
FIG. 4 is a block diagram that shows a schematic function constitution of the agent according to the first embodiment of the present disclosure.

FIG. 4 is a block diagram that shows a schematic function constitution of the agent according to the first embodiment of the present disclosure. Referring to FIG. 4, in the present embodiment, each of the functions, specifically a speech acquisition function 351, a speech recognition function 353, a request generating function 355, a request transmitting function 357, a response receiving function 359, a response analyzing function 361, a timing control function 363, a text generating function 367, and a text output function 369, are realized as functions of the agent 300.

These functions may for example all be realized by the processor 102 of the client device 100, or the processor 202 of the server device 200. For example, in the case of the speech acquisition function 351 being realized by the processor 202 of the server device 200, the processor 202 acquires the speech data that was acquired via the microphone 118 of the client device 100 via network communication with the client device 100 by the communication module 208. Also, for example, in the case of the text output function 369 being realized by the processor 202 of the server device 200, the processor 202 provides to the client device 100 the speech data that has been generated via network communication by the communication module 208, and outputs speech from the speaker 116 of the client device 100.

Also, some of the aforementioned functions may be realized by the processor 102 of the client device 100, and the rest may be realized by the processor 202 of the server device 200. In this case, the processor 102 and the processor 202 work together via network communication between the communication modules 108 and 208. In the case of the server 20 being constituted by a plurality of server devices 200, at least a portion of the aforementioned functions can be realized dispersed over the plurality of server devices 200. In this case, one function may be realized dispersed over the plurality of server devices 200, or one server device 200 may realize a plurality of functions.

The speech acquisition function 351 acquires speech data that expresses the uttered speech of the user via the microphone 118 of the client device 100. The speech recognition function 353 executes speech recognition based on the speech data that was acquired by the speech acquisition function 351, and converts the speech data to text (character data). Note that with regard to speech recognition, since it is possible to suitably utilize various technologies already known, a detailed description thereof shall be omitted here.

The request generating function 355 generates a request based on the text that was recognized in the speech recognition function 353 (text that was input by speech by the user). The request generating function 355 executes natural language processing such as morphological analysis and syntax analysis on the text as necessary, and grasps the semantic content of the text. Note that with regard to natural language processing, since it is possible to suitably utilize various technologies already known, a detailed description thereof shall be omitted here. Note that the request generating function 355 is also capable of generating a request based on the response analysis result by the response analyzing function 361, but this shall be discussed further below.

Here, the request that is generated by the request generating function 355 may for example be a code that is generated in accordance with a predetermined protocol that is specified in the system 10. In this case, another agent 300 is capable of easily analyzing a request that is transmitted (handled as a response at the receiving side). Alternatively, text that is input by speech by the user may be included in the request that is generated by the request generating function 355 in addition to the aforementioned code or in place of it. In this case, for example the text generating function 367 described below can easily generate text that corresponds to the response (a request that is transmitted by another agent 300).

The request generating function 355 is capable of generating various requests in accordance with the semantic content of the text that has been input by speech by the user. For example, in response to such inputs as "I'd like to know tomorrow's whether", or "Is there anything to watch on TV tonight?", a request for information such as "tomorrow's weather forecast" or "tonight's recommended programs" may be generated for the server 20 or a server that provides another service. In the following description, the function that executes a schedule adjustment with another agent 300 shall be described in particular, while descriptions of other functions shall be omitted, but since these functions can be realized using already known technology, it is obvious to a person skilled in the art that the agent 300 can also realize functions other than schedule adjustment.

The request transmitting function 357 transmits the request generated by the request generating function 355. The transmission destination of the request may be another agent 300. As mentioned above, the functions of the agent 300 may be realized in the client device 100 that each user uses, or may be realized in the server 20. Accordingly, transmission of a request by the request transmitting function 357 may be a transmission via network communication between client devices 100, and may also be an internal transmission within the server 20.

The response receiving function 359 receives a response corresponding to the request that was transmitted by the request transmitting function 357. Note that "request" and "response" are relative for the agent 300 that is being described in the present specification. That is to say, a request that is transmitted by the agent 300a is handled as a response at the agent 300b that is the transmission destination (receiving side). Conversely, a request that is transmitted by the agent 300b is handled as a response at the agent 300a. Therefore, for a given agent 300, it is also possible for a response to be received prior to transmitting a request.

The response analyzing function 361 analyzes the response that has been received by the response receiving function 359. Here, the response is a request that another agent 300 has transmitted. Accordingly, as has been described with regard to a request, a response may be a code that is generated in accordance with a predetermined protocol that is specified in the system 10, and may also be text that is input by speech by the user in the agent 300 at the transmission side. The response analyzing function 361, in accordance with the content of this kind of response, may for example simply analyze the response in accordance with a protocol, or may grasp the semantic content of the text that is included in the response by executing natural language processing.

Here, the analysis result of the response by the response analyzing function 361 passes through the timing control function 363 to be provided to the request generating function 355, and also be provided to the text generating function 367. Hereinbelow, first, the text generating function 367 shall be described.

The text generating function 367 generates text based on the analysis result of the response in the response analyzing function 361. The text that is generated serves to inform the user of the semantic content of the received response, and so may for example have a conversational tone. Here, in the case of text that has been input by speech by the user at the transmission-side agent 300 being included in the response, the text generating function 367 may utilize that text as is. Moreover, in the case of a new request having been automatically generated by the request generating function 355 as described below, the text generating function 367 may generate text based on the generated request. The text output function 369 outputs by speech the text generated by the text generating function 367 to the user via the speaker 116 of the client device 100.

On the other hand, the analysis result of the response provided to the request generating function 355 through the timing control function 363 is utilized for generation of a new request by the request generating function 355. Based on the response analysis result, the request generating function 355 generates a new request, referring to the schedule DB 365 as necessary. The schedule DB 365 is realized by the storage 106 of the client device 100 or the storage 206 of the server device 200, and stores the schedule information of the user of the agent 300. The request generating function 355, in the case of for example a response being a request for a schedule adjustment that was generated based on the schedule information of another user, generates a new request with respect to this response, referring to the user schedule information stored in the schedule DB 365.

Here, the timing control function 363 controls the timing at which the request generating function 355 generates new requests based on the timing at which text is output by speech by the text output function 369. More specifically, the timing control function 363 sets a standby time until a request is newly generated by the request generating function 355, after the text has been output by speech by the text output function 369. Thereby, for example, even if the request generating function 355 is capable of immediately generating a new request based on the response analysis result by the response analyzing function 361, during the standby time, the request generating function 355 is controlled by the timing control function 363 so as to not generate a new request.

This standby time may be set to wait for a response by the user to the text that has been output by speech. Accordingly, during the standby-time, in the case of the speech data of uttered speech of the user being acquired by the speech acquisition function 351, the request generating function 355 generates a new request based on the new text that was input by speech by the user, and the request transmitting function 357 transmits the generated request. In such an event, the standby time may be ended prior to completion.

On the other hand, in the case of the speech acquisition function 351 having not acquired speech data of uttered speech of the user by the end of the standby time, that is to say, in the case of text not being input by speech by the user during the standby time, the request generating function 355 automatically generates a new request based on the analysis result of the response by the response analyzing function 361, and the request transmitting function 357 transmits the generated request.

That is to say, in the present embodiment, the semantic content of the response that has been received is output by speech to the user by the text output function 369, since the timing control function 363 inhibits the automatic generation of a request by the request generating function 355 for a while thereafter, it is possible for the user to intervene by making an utterance with respect to a response that has been received is possible. Also, in the case of there having been no user intervention, since a new request is automatically generated to the response, in the case of the user feeling no necessity to intervene, or in the case of being too preoccupied to intervene and the like, it is possible to proceed with the schedule adjustment without troubling the user.

1.3 Process Flow (Process During Initial Request Transmission)

Figure 5:
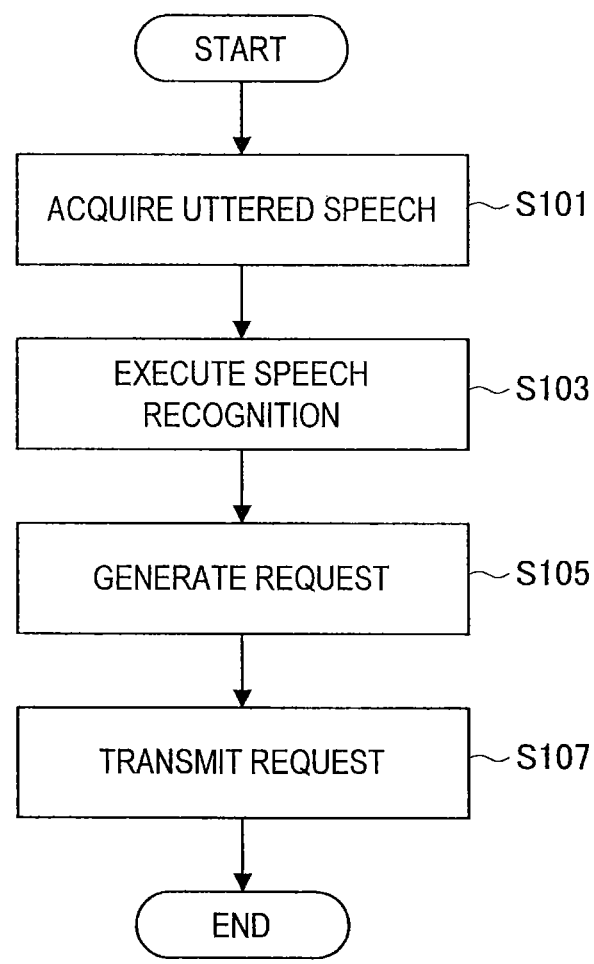
FIG. 5 is a flowchart that shows an example of the process in the case of initially transmitting a request in the first embodiment of the present disclosure.

FIG. 5 is a flowchart that shows an example of the process in the case of initially transmitting a request in the first embodiment of the present disclosure.

In this case, first, the speech acquisition function 351 acquires the speech data of the user's uttered speech (Step S101). Next, the speech recognition function 353 executes speech recognition on the acquired speech data (Step S103). Furthermore, the request generating function 355 generates a request based on the text that was obtained as the result of the speech recognition (Step S105), and the request transmitting function 357 transmits the generated request (Step S107).

This kind of process is executed when for example the agent 300 starts interacting with another agent 300 as a result of acquiring an utterance of the user.

(Process During Second and Subsequent Request Transmission)

Figure 6:
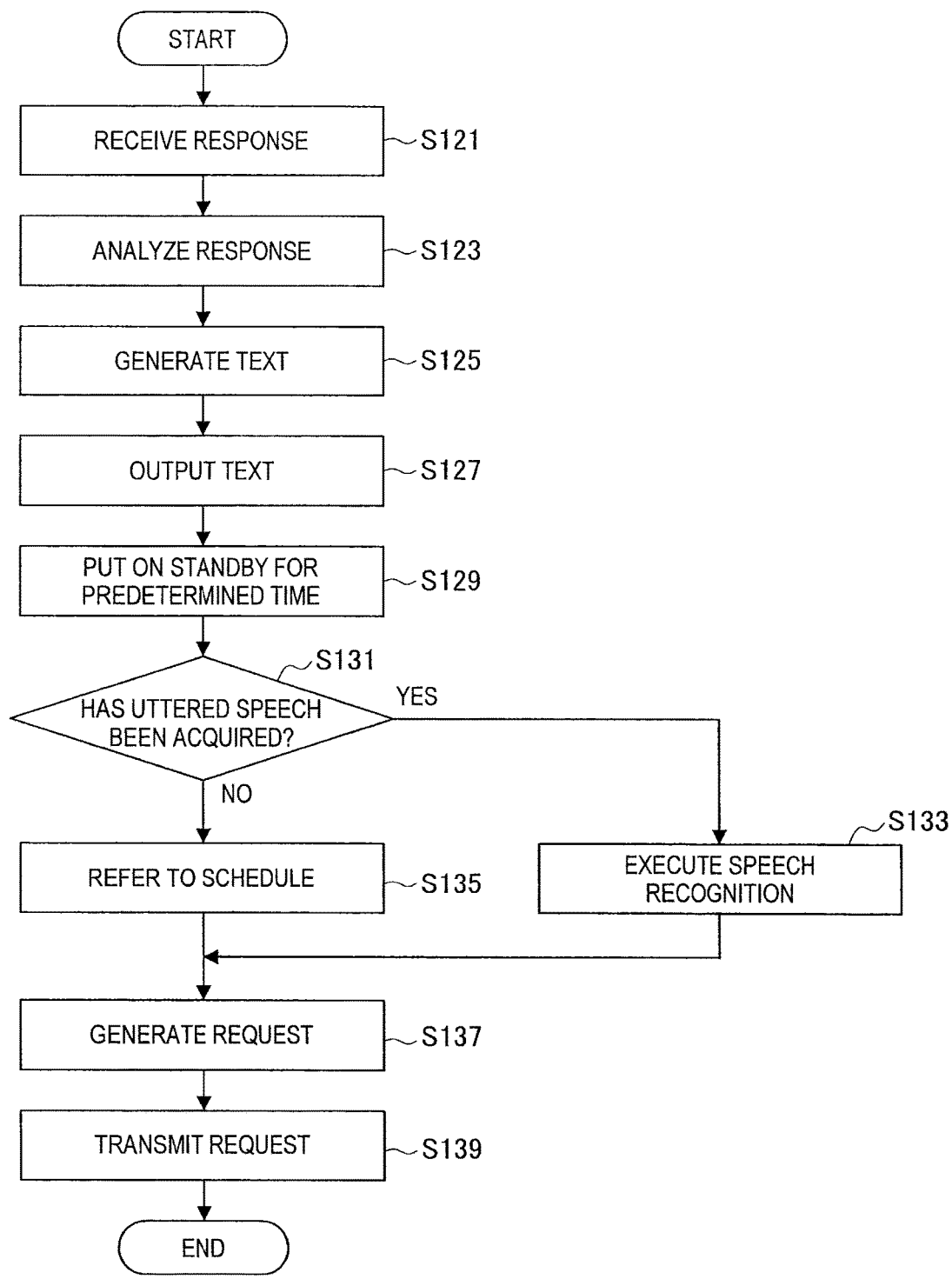
FIG. 6 is a flowchart that shows an example of the process in the case of the second and subsequent times of transmitting a request in the first embodiment of the present disclosure.

FIG. 6 is a flowchart that shows an example of the process in the case of the second and subsequent times of transmitting a request in the first embodiment of the present disclosure. The process is the same in the agent 300 that receives the aforementioned initial request shown in FIG. 5, that is, the agent 300 that receives the response prior to the request.

In this case, first the response receiving function 359 receives a response from another agent 300 (Step S121). Next, the response analyzing function 361 analyzes the response (Step S123). Furthermore, based on the analysis result of the response, the text generating function 367 generates text (Step S125), and the text output function 369 outputs by speech the generated text to the user (Step S127). Here, the timing control function 363 puts the generation of a new request by the request generating function 355 on standby for a predetermined time (Step S129).

During the standby of Step S129, the speech acquisition function 351 waits for speech data of uttered speech of the user (Step S131). Here, in the case of speech data of uttered speech being acquired (YES), the speech recognition function 353 executes speech recognition on the speech data that was acquired (Step S133). In that case, the request generating function 355 generates a new request based on the text acquired by the speech recognition (Step S137).

On the other hand, in the case of the speech acquisition function 351 that waited for speech data of uttered speech of the user not acquiring speech data in Step 131 (NO), the request generating function 355, based on the response analysis result, automatically generates a new request (Step S137) referring to the schedule DB 365 as necessary (Step S135).

The request that is generated by the request generating function 355 in Step S137 is transmitted by the request transmitting function 357 (Step S139). Note that in the case of schedule coordination among the agents 300 of for example three or more users, the transmission destination of a request in Step S139 does not necessarily agree with the transmission source of the response in Step S121.

In the present embodiment, by the aforementioned process being repeatedly executed in each agent 300, schedule coordination among users is carried out. Next, a specific example of such schedule coordination shall be described.

1.4 Specific Example

Figure 7:
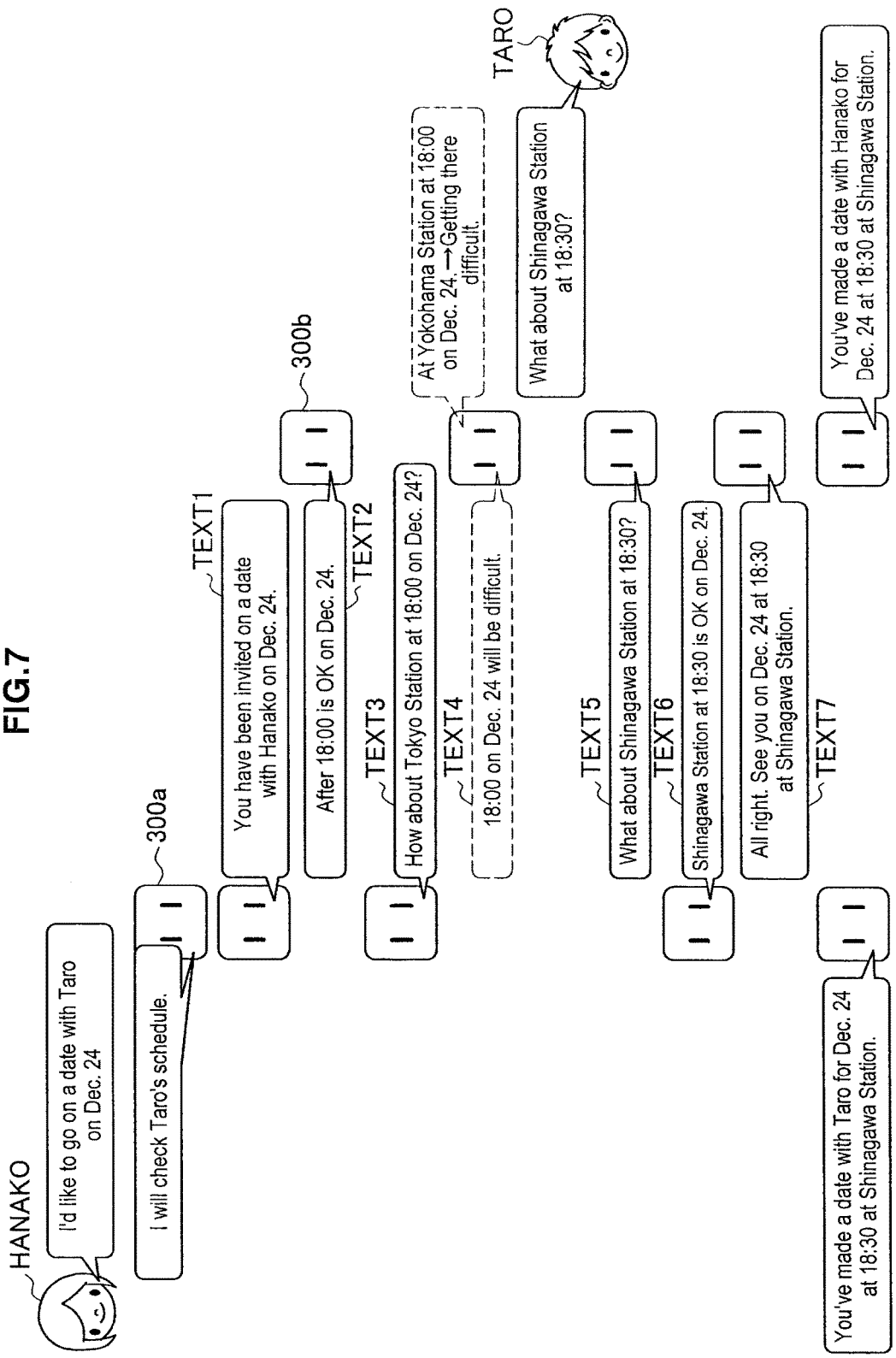
FIG. 7 is a drawing for describing a specific example of the first embodiment of the disclosure.

FIG. 7 is a drawing for describing a specific example of the first embodiment of the present disclosure. In the disclosed example, an interaction for schedule coordination is executed between the agent 300a of a woman named Hanako and the agent 300b of a man named Taro.

Note that as described above, a request and a response in the present embodiment are defined relative to each agent. For example, a request that is defined in the agent 300a is a response in the agent 300b. Therefore, in the following example, requests and responses shall be called messages in order to simplify the explanation.

In the illustrated example, first the interaction is started by an utterance of Hanako, who says, "I'd like to go on a date with Taro on Dec. 24." The agent 300a that acquired this uttered speech outputs the spoken reply of "I will check Taro's schedule" (although not shown in the aforementioned function constitution and flowchart, replying with speech to an utterance of the user is already known as a general function of an agent), and then transmits a message conveying an invitation from Hanako to the agent 300b of Taro. Here, the message that is actually transmitted may for example be a code that is generated in accordance with a specified protocol in the system 10.

When the agent 300b of Taro receives the aforementioned message, the text generating function 367 generates the text (TEXT 1) of "You have been invited on a date with Hanako on Dec. 24", and outputs it by speech to Taro. At this point, after the output of the text (TEXT 1), the timing control function 363 causes Taro's agent 300b to wait for Taro's reply for a predetermined time.

In the illustrated example, since a reply by Taro is not acquired during the standby period, the agent 300b refers to the schedule information of Taro that is stored in the schedule DB 365 (assuming authorization to access Taro's schedule information has been granted to Hanako), and generates a message that replies with a suitable time on the designated date (December 24). In the illustrated example, since there is available time in Taro's schedule after 18:00 on December 24, a message to the effect that anytime after 18:00 is OK is transmitted from Taro's agent 300b to Hanako's agent 300b.

Here, in the same manner as Taro's agent 300b, when Hanako's agent 300a receives a message, the text generating function 367 generates the text (TEXT 2) of "After 18:00 is OK on Dec. 24", and outputs it by speech to Hanako. At this point as well, after the output of the text (TEXT 2), the timing control function 363 causes Hanako's agent 300a to wait for Hanako's reply for a predetermined time.

Since a reply by Hanako is not acquired during the standby period, the agent 300a refers to the schedule information of Hanako that is stored in the schedule DB 365 and confirms that there is available time in Hanako's schedule as well after 18:00 on December 24. Moreover, since the agent 300a has determined from the schedule information that Hanako will be in the vicinity of Tokyo Station before 18:00 on December 24, it automatically generates a message that proposes that location and transmits it to Taro's agent 300b.

Similarly to the exchange thus far, Taro's agent 300b that has received the message outputs to speech the text (TEXT 3) "How about Tokyo Station at 18:00 on Dec. 24?", and waits for Taro's reply for a predetermined time. Here, since Taro's reply is not acquired during the waiting period, the agent 300b once again refers to Taro's schedule information that is stored in the schedule DB 365 and determines whether or not Taro can make it to Tokyo Station at 18:00 on December 24. Since Taro has a separate engagement at Yokohama Station until 18:00 on December 24, it is judged difficult for him to be at Tokyo Station at 18:00. Accordingly, in the case of Taro's agent 300b automatically generating a response, a message such as the text (TEXT 4) of "18:00 on Dec. 24 will be difficult" is generated.

However, in the illustrated example, during the standby period, Taro utters to the agent 300b the reply "What about Shinagawa Station at 18:30?" The agent 300b that has acquired this utterance transmits a message that conveys Taro's reply to Hanako's agent 300a. Upon receiving it, Hanako's agent 300a outputs to speech the text (TEXT 5) "What about Shinagawa Station at 18:30?"

Since Hanako has no objection to this she does not reply, and as a result of the agent 300a referring to Hanako's schedule information, it is possible for her to go to Shinagawa Station at 18:30. Therefore, the agent 300a automatically generates a message to the effect of consent, and transmits it to Taro's agent 300b. Upon receiving it, Taro's agent 300b outputs to speech the text (TEXT 6) of "Shinagawa Station at 18:30 is OK on Dec. 24."

Since Taro also has no objection to this and so does not reply, Taro's agent 300b also automatically generates a message to the effect of consent, and transmits it to Hanako's agent 300a. Upon receiving this, Hanako's agent 300a outputs to speech the text (TEXT 7) of "All right. See you on Dec. 24 at 18:30 at Shinagawa Station."

By such an exchange between the agents 300, the schedule coordination of Taro and Hanako is completed. The agents 300a and 300b respectively register the scheduling of a date at Shinagawa Station on December 24 at 18:30, output to speech text such as "You've made a date with Taro (Hanako) for Dec. 24 at 18:30 at Shinagawa Station", and notify Hanako and Taro of the completion of the schedule coordination.

In the exchange of the aforementioned example, when the schedule coordination was not completed by the condition that was initially proposed (Tokyo Station at 18:00), Taro intervened in the exchange between the agents 300, and proposed a new time and place, whereby the schedule coordination was smoothly carried out. In this way, according to the present embodiment, the agent 300 executes by proxy mundane tasks of the user such as checking schedule information, and can put to practical use user knowledge (for example, Shinagawa Station is located between Tokyo Station and Yokohama Station, and there is a place in the vicinity of Shinagawa Station where Taro and Hanako go on dates) for schedule adjustment, and it is possible to generate a more suitable schedule.

2. Second Embodiment

Next, the second embodiment of the present disclosure shall be described. Since the system constitution and function constitution of the present embodiment are the same as the first embodiment except for the timing control function 363 that shall be described below, detailed descriptions thereof shall be omitted. Also, since the process flow during transmission of the initial request is also the same as in the first embodiment, a detailed description thereof shall be omitted.

2.1 Process Flow (Process During Second and Subsequent Request Transmission)

Figure 8:
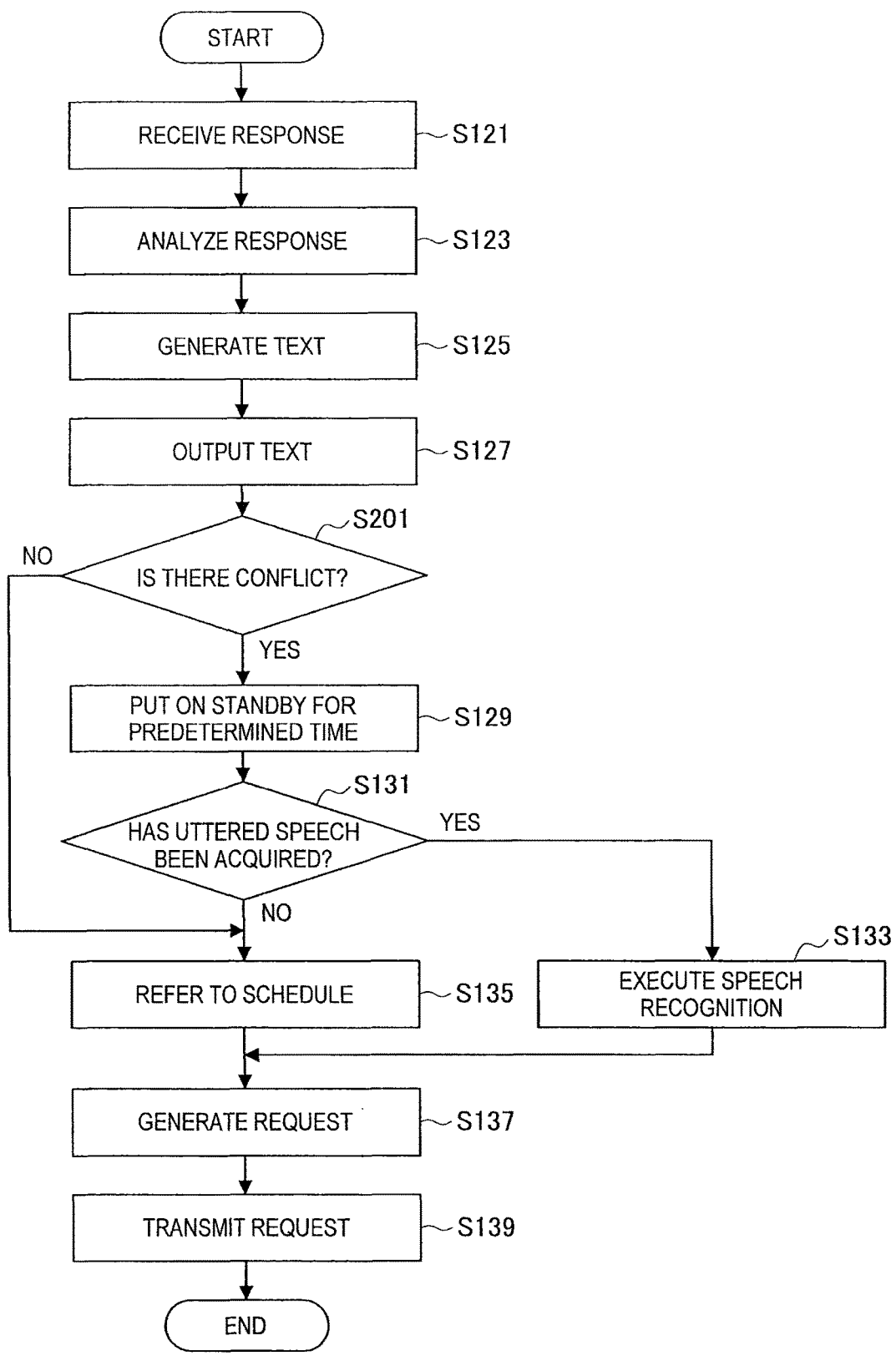
FIG. 8 is a flowchart that shows an example of the process in the case of the second and subsequent times of transmitting a request in the second embodiment of the present disclosure.

FIG. 8 is a flowchart that shows an example of the process in the case of the second and subsequent times of transmitting a request in the second embodiment of the present disclosure. Note that since the steps of the flowchart described below are the same as the flowchart described referring to FIG. 6 above except for Step S201, detailed descriptions of those steps shall be omitted.

In the illustrated example, after the text output function 369 has outputted to speech the text, the timing control function 363 judges whether or not a conflict has occurred in the schedule coordination, based on the result analysis result (Step S201). Here, in the schedule coordination, each agent 300 generates a request based on the schedule information of each user. Accordingly, the conflict that has been determined in Step S201 refers to a conflict between a request that is transmitted in the agent 300 (based on the user's schedule information) and the response that is received (based on the schedule information of another user).

In Step S201, in the case of no conflict occurring (NO), the request generating function 355 automatically generates a new request (Step S137) referring to the schedule DB 365 (Step S135), with there being no execution of a standby of a predetermined time by the timing control function 363 (Step S129).

On the other hand, in Step S201, in the case of a conflict occurring in Step S201 (YES), the timing control function 363 puts the generation of a new request by the request generating function 355 on standby for a predetermined time (Step S129), and the same steps as the aforementioned example of FIG. 6 are executed below.

In the aforementioned example, the Step S201 was described as occurring after Step S127, but the Step S201 may be executed at any timing after Step S123, without waiting for the output of the text by the text output function 369.

In this way, in the present embodiment, the timing control function 363 of the agent 300 determines whether or not to set a standby time until the new request generation by the request generating function 355, based on the response analysis result. For example, in the case of a conflict occurring in the schedule coordination, since there is a high possibility of an optimum solution being obtainable by intervention of the user, it may be reasonable to set a standby time and wait for the user's reply, in the above manner. Otherwise, by not setting a standby time, it is possible to quickly proceed with the coordination of schedules among agents 300. Also, in the case of not setting a standby time, by executing the output of text by the text output function 369, when user intervention is requested, it is possible for the user to easily grasp the situation.

As the function of the timing control function 363 described above, the following modifications are also possible. For example, the timing control function 363 may set a standby time in the case of the request to be newly generated based on the response analysis result being negative content with respect to that response. This is the case when a negative request has to be generated with respect to a time or place proposed by the response that was received, in the manner of the TEXT 4 in the example described referring to FIG. 7 in the first embodiment (actually corresponding to a request that was not transmitted in the example). In this case, the timing control function 363 may decide whether or not to set a standby time in expectation of a request being newly generated based on the response analysis result.

Also, for example, the timing control function 363 may set a standby time in the case of a received response being negative content with respect to the request that was previously transmitted. This for example is the case of a request corresponding to TEXT 3 actually having been transmitted, in the example described referring similarly to FIG. 7. In this case, the agent 300a that received the response with negative content of "18:00 on Dec. 24 is difficult" (corresponding to TEXT 4) to the request that was previously transmitted (corresponding to TEXT 3) may set a standby time (which had until then not been set) in order to wait for a reply to Hanako to the response.

2.2 Specific Example

FIGS. 9 to 14 are drawings for describing a specific example of the second embodiment of the present disclosure. In the illustrated example, an exchange for schedule coordination is executed between the agent 300a of Hanako and the agents 300b to 300d belonging to team members. Note that in this example as well, in order to simplify the explanation, requests and responses shall be called messages.

Figure 9:
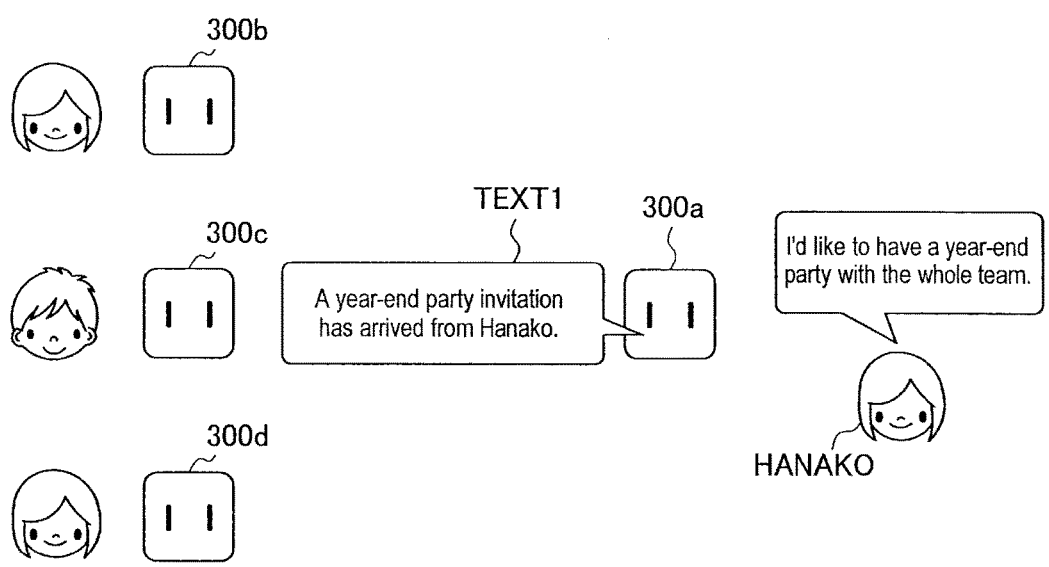
FIG. 9 is a drawing for describing a specific example of the second embodiment of the present disclosure.

In the illustrated example, as shown in FIG. 9, first the interaction is started by an utterance of Hanako, who says, "I'd like to have a year-end party with the whole team". The agent 300a that acquired this uttered speech outputs a message that conveys the invitation from Hanako to the agents 300b to 300d of each team member. Here, the message that is actually transmitted is for example a code that is generated in accordance with a protocol that is specified in the system 10.

When the agents 300b to 300d of each team member receive the request, the text generating function 367 generates the text (TEXT 1) of "A year-end party invitation has arrived from Hanako", and outputs it by speech. At this point, since a conflict has not yet occurred in the schedule coordination, the agents 300b to 300d immediately execute generation of the next message without waiting for a reply from each respective team member.

Figure 10:
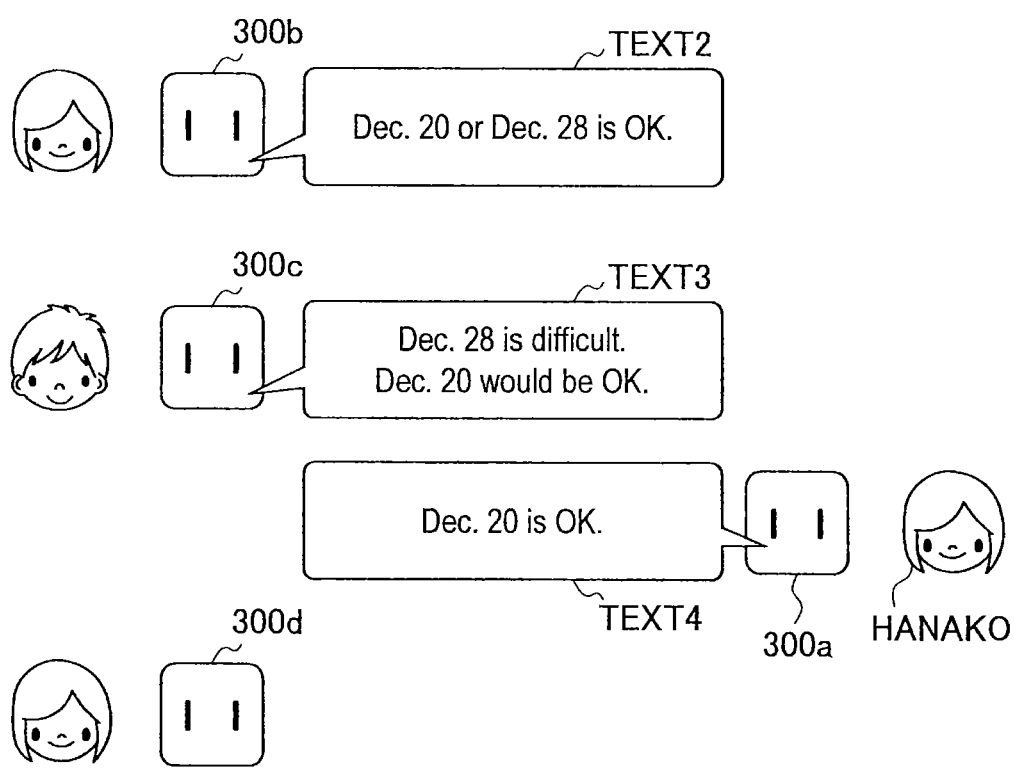
FIG. 10 is a drawing for describing a specific example of the second embodiment of the present disclosure.

As a result, as shown in FIG. 10, a message with the content of "Dec. 20 or Dec. 28 is OK" (which is output by speech to each user as TEXT 2) is transmitted from the agent 300b to the agents 300a, 300c, and 300d. Also, agent 300c, after the reception of that message that was received from agent 300b, transmits to the agents 300a, 300b, and 300d a message with the content of "Dec. 28 is difficult. Dec. 20 would be OK" (which is output by speech to each user as TEXT 3).

Moreover, the agent 300a of Hanako, after receiving the aforementioned messages from the agents 300b and 300c, refers to Hanako's own schedule information and transmits to the agents 300b to 300d a message with the content of "Dec. 20 is OK" (which is output by speech to each user as TEXT 4). As described above, these messages are transmitted without waiting for replies of each team member, but text corresponding to the messages is output to speech, whereby each team member can grasp the exchanges between the agents 300.

Figure 11:
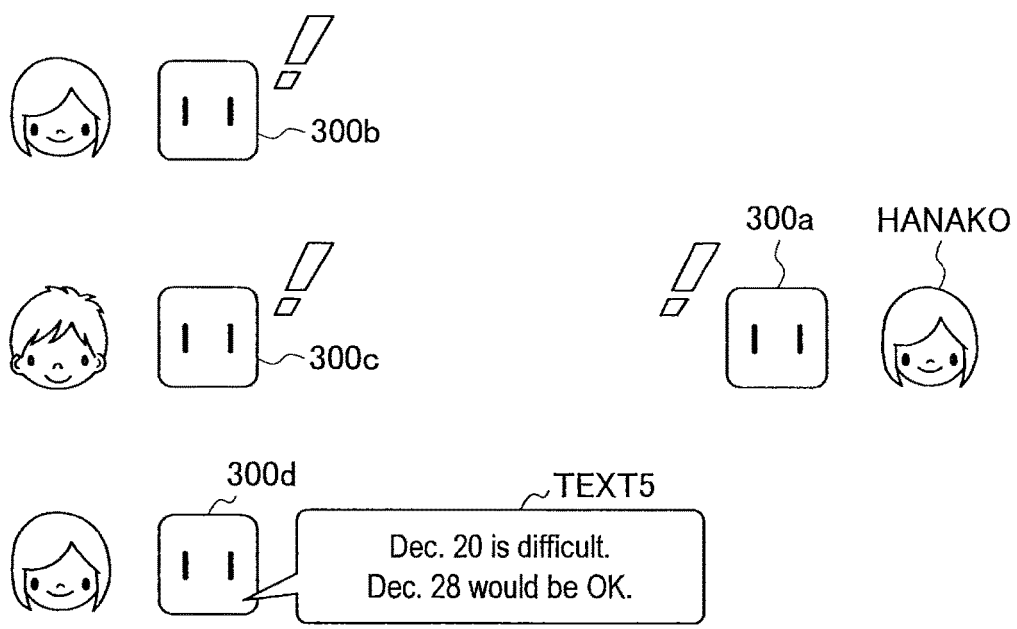
FIG. 11 is a drawing for describing a specific example of the second embodiment of the present disclosure.

Next, as shown in FIG. 11, a message from agent 300d is transmitted. Here, agent 300d referred to schedule information of December 20, which at the present time appears to be convenient for the team members, but since there was no free time, transmits to the agents 300a to 300c a message with the content of "Dec. 20 is difficult. Dec. 28 would be OK" (which is output by speech to each user as TEXT 5).

At this point, a conflict has occurred in the schedule coordination between the agents 300a to 300d. Not only agent 300d but also agents 300a to 300c acknowledge the occurrence of a conflict by having received the message from agent 300d. Here, a standby time for waiting for a reply from each user is set by the timing control function 363 of each agent 300.

Figure 12:
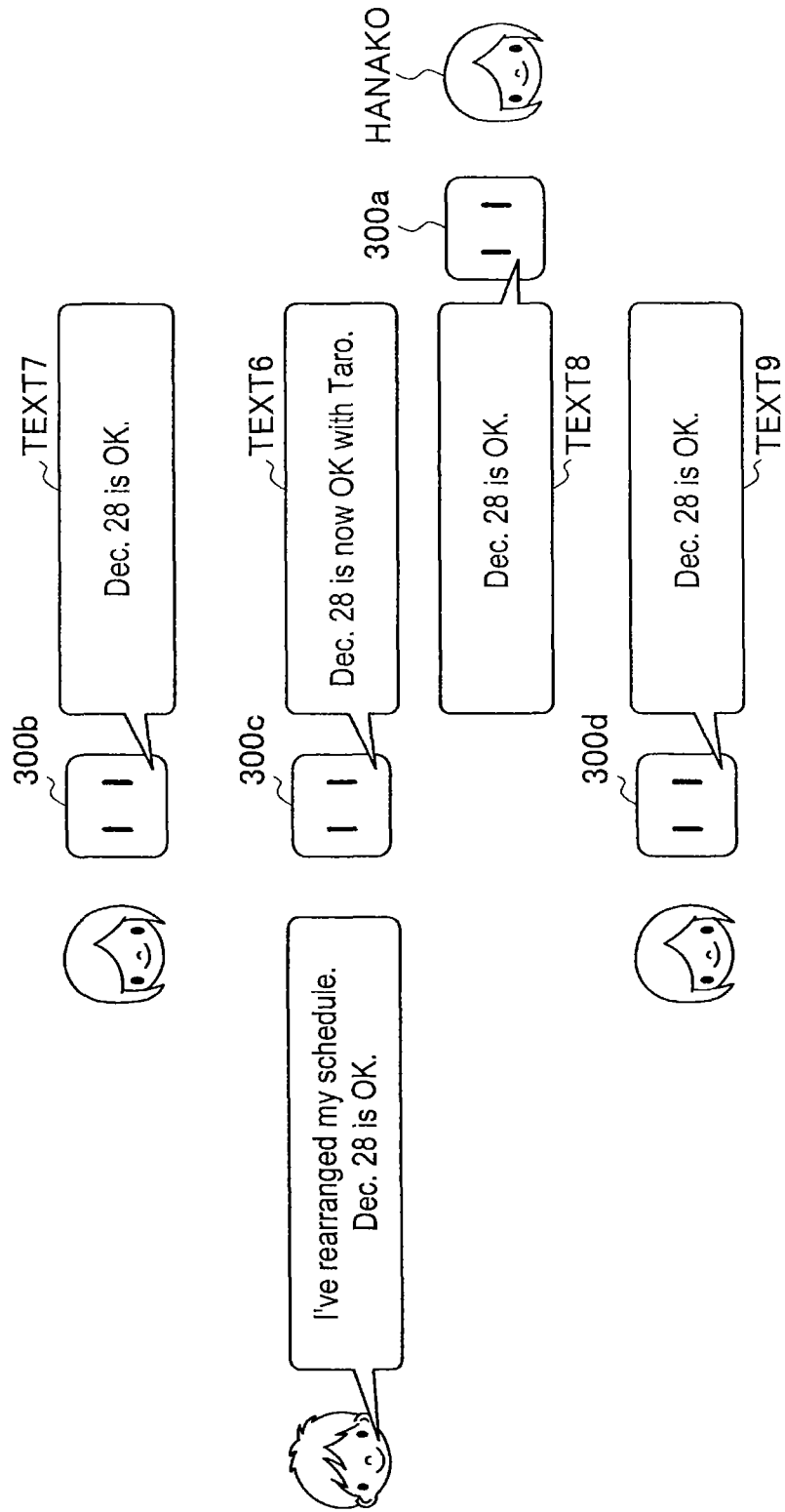
FIG. 12 is a drawing for describing a specific example of the second embodiment of the present disclosure.

Then, as shown in FIG. 12, one of the team members (Taro) utters to the agent 300c the reply of "I've rearranged my schedule. Dec. 28 is OK". Upon receiving this, the agent 300c transmits to the agents 300a, 200b, and 300d a message with the content of "Dec. 28 is now OK with Taro" (which is output by speech to each user as TEXT 6). Upon receiving this, a message is transmitted from the agents 300a, 300b, and 300d with the content of "Dec. 28 is OK" (which is output by speech to each user as TEXT 7 to TEXT 9).

Figure 13:
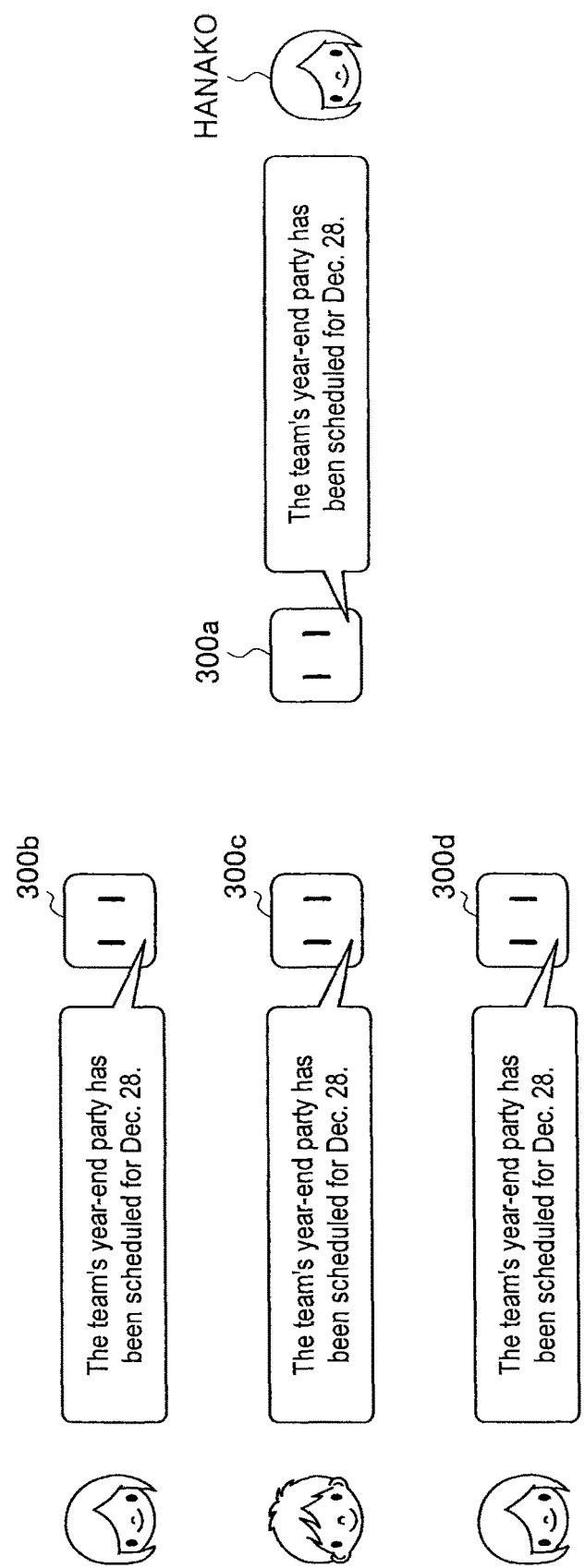
FIG. 13 is a drawing for describing a specific example of the second embodiment of the present disclosure.

By the exchange between the agents 300 in the above manner, the schedule coordination among the team members is completed, as shown in FIG. 13. The agents 300a to 300d add the year-end party on December 28 to the schedule of their respective users, and output by speech text such as "The team's year-end party has been scheduled for Dec. 28" to notify each user of the completion of the schedule coordination.

3. Addendum

In the embodiments described above, texts corresponding to responses that the agents 300 received were output by speech to the user, but texts may also be output by being displayed as an image on the display 110 of the client device 100. Similarly, texts corresponding to requests that the agents 300 automatically generate and transmit may also be displayed on the display 110 as images. In this case, messages that are exchanged between agents 300 are for example displayed one after another in the format of a chat log.

Also, in the embodiments described above, a user inputs text to the agent 300 by speech-input, but the text may also be input for example by keyboard (including a so-called soft keyboard that used the touch panel 114).

The embodiments of the present disclosure may include the information processing device (client device or server device) as described above, a system, an information processing method that is executed by the information processing device or the system, a program for causing the information processing system to function, and a non-transitory tangible medium in which the program is recorded.

While preferred embodiments of the present disclosure have been described in detail above referring to the appended drawings, the technical scope of the present disclosure is not limited to such examples. It is obvious that a person having ordinary knowledge in the technical field of the present disclosure could conceive of various modifications or revisions within the scope of the technical concepts described in the claims. These are naturally also understood as falling under the technical scope of the present disclosure.

Additionally, the present technology may also be configured as below.

(1) An information processing device including:
a request transmitting portion that transmits a request;
a response receiving portion that receives a response corresponding to the request;
a response analyzing portion that analyzes the response;
a text output portion that outputs, to the user, text generated based on the response analysis result;
a request generating portion that newly generates the request based on the response analysis result or text input by the user; and
a timing control portion that controls a timing at which the request is newly generated based on a timing at which the generated text is output.

(2) The information processing device according to (1), wherein the timing control portion, after the generated text has been output, sets a standby time until the request is newly generated.

(3) The information processing device according to (2), wherein in a case of text being input by the user during the standby time, the request generating portion newly generates the request based on the text that has been input.

(4) The information processing device according to (3), wherein in a case of text not being input by the user during the standby time, the request generating portion newly generates the request based on the response analysis result.

(5) The information processing device according to any one of (2) to (4), wherein the timing control portion decides whether or not to set the standby time based on the response analysis result.

(6) The information processing device according to (5), wherein the timing control portion sets the standby time in a case of the request that is newly generated based on the response analysis result being negative content with respect to the response.

(7) The information processing device according to (5), wherein the timing control portion sets the standby time in a case of the response being negative content with respect to the request that has been previously transmitted.

(8) The information processing device according to any one of (1) to (7), wherein the text output portion additionally outputs, to the user, text that is generated based on the request that the request generating portion has generated based on the response analysis result.

(9) The information processing device according to any one of (1) to (8), wherein the text output portion outputs to speech the generated text.

(10) The information processing device according to any one of (1) to (9), wherein the request generating portion acquires text input by speech by the user.

(11) The information processing device according to any one of (1) to (10), wherein the text output portion outputs the generated text as an image.

(12) The information processing device according to any one of (1) to (11),
wherein the request generating portion generates the request based moreover on schedule information of the user, and
wherein the response receiving portion receives the response generated based on the schedule information of another user.

(13) The information processing device according to (12), wherein in a case of a conflict occurring between the request and the response, the timing control portion, after the generated text has been output, sets a standby time until the request is newly generated.

(14) An information processing method including:
transmitting a request;
receiving a response corresponding to the request;
analyzing the response;
outputting, to the user, text generated based on the response analysis result;
newly generating the request based on the response analysis result or text input by the user; and
controlling a timing at which the request is newly generated based on a timing at which the generated text is output.

(15) A program for causing a computer to realize:
a function that transmits a request;
a function that receives a response corresponding to the request;
a function that analyzes the response;
a function that outputs, to the user, text generated based on the response analysis result;
a function that newly generates the request based on the response analysis result or text input by the user; and
a function that controls a timing at which the request is newly generated based on a timing at which the generated text is output.

What is claimed is:
1. An information processing device comprising:
a display configured to display visual data including a graphical user interface (GUI);
a touch sensor configured to receive user inputs within the GUI;
a transceiver configured to communicate with a server;
a microphone configured to acquire speech data of a user's uttered speech at the information processing device, wherein the speech data is an electronic signal that is based on sounds generated in a vicinity of the microphone, wherein the sounds include the user's uttered speech; and
a processor configured to:
generate a first request based on the speech data;
transmit, using the transceiver, the first request from the information processing device to a client device via the server;

receive, using the transceiver, a response based on the first request at the information processing device from the client device via the server;

analyze the response based on at least one of a language analysis protocol and natural language processing of semantic content associated with the response;

generate a text based on a result of the response analysis;

output the text on the display of the information processing device;

initiate a timer upon output of the text on the information processing device;

determine if an intervening speech data is received via the microphone at the information processing device;

wherein, when it is determined that the intervening speech data is received from the user of the information processing device prior to expiration of the timer, the processor is configured to generate a second request based on the intervening speech data, and transmit, using the transceiver, the second request to the client device via the server; and wherein, when it is determined that the intervening speech data is not received from the user of the information processing device prior to expiration of the timer, the processor is configured to generate a third request based on the result of the response analysis, and transmit, using the transceiver, the third request to the client device via the server.

2. The information processing device according to claim 1, wherein the processor is further configured to determine if an intervening text input is received via a user interface at the touch sensor at the information processing device prior to expiration of the timer.

3. The information processing device according to claim 2, wherein the processor is further configured to, when it is determined that the intervening text input is received from the user of the information processing device prior to expiration of the timer, generate and transmit a fourth request based on the intervening text input to the client device via the server.

4. The information processing device according to claim 3, wherein the processor is further configured to, when it is determined that the intervening text input is not received from the user of the information processing device prior to expiration of the timer, generate and transmit a fifth request based on the intervening text input to the client device via the server.

5. The information processing device according to claim 2, wherein the processor is further configured to initiate the timer based on the response analysis.

6. The information processing device according to claim 5, wherein the processor is further configured to initiate the timer when the response analysis includes negative content associated with a rejection of the first request.

7. The information processing device according to claim 5, wherein the processor is further configured to initiate the timer when the response analysis triggers the third request to include negative content associated with a rejection of the response.

8. The information processing device according to claim 1, wherein the processor is further configured to output the third request on the information processing device in addition to outputting the text on the information processing device.

9. The information processing device according to claim 1, wherein the processor is further configured to output the text as speech.

10. The information processing device according to claim 1, further comprising:
a user interface configured to receive manual text input at the information processing device; and
generate the first request based on the manual text input.

11. The information processing device according to claim 1, wherein the processor is further configured to generate the first request based on the speech data and first schedule information of the user of the information processing device, and wherein the response is generated at the client device based on second schedule information of a user at the client device.

12. The information processing device according to claim 11, wherein the processor is further configured to initiate the timer in a case of a conflict occurring between the request and the response based on the first schedule information and the second schedule information.

* * * * *